Oct. 7, 1969

N. A. BEDDOWS 3,471,780

MOISTURE AND TEMPERATURE COMPENSATING CAPACITIVE
FILM THICKNESS GAUGE

Filed Feb. 27, 1967

INVENTOR:
NORMAN A. BEDDOWS,

BY *Robert J. Bird*

HIS ATTORNEY.

United States Patent Office 3,471,780
Patented Oct. 7, 1969

3,471,780
MOISTURE AND TEMPERATURE COMPENSATING CAPACITIVE FILM THICKNESS GAUGE
Norman A. Beddows, Schenectady, N.Y., assignor to General Electric Company, a corporation of New York
Filed Feb. 27, 1967, Ser. No. 618,871
Int. Cl. G01r 27/26
U.S. Cl. 324—61
4 Claims

ABSTRACT OF THE DISCLOSURE

A capacitance gauge for monitoring thickness of a dielectric film passing between its plates. The gauge is temperature compensated by provision for maintaining constant distance between plates regardless of temperature. The gauge is also moisture compensated by provision for adjusting the capitance between the plates.

BACKGROUND OF THE INVENTION

Figure 1:
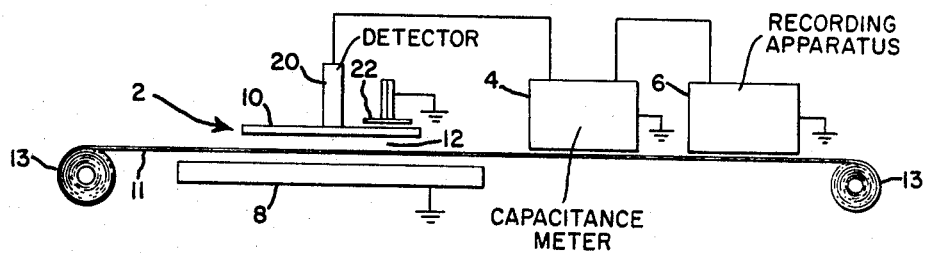

The present invention relates to apparatus for continuously measuring thickness of sheet or web materials as they move through a capacitive cell. More particularly, the present invention relates to a gauge of the capacitance type for accurately measuring the thickness of a sheet material or a film like material (adhesive, plastic coating, etc.) cast and supported on a sheet material of uniform thickness and dielectric constant (silicone coated parchment paper, Teflon etc.), passed therethrough.

Capacitance type thickness gauges are known to the prior art. In such an apparatus, a continuous measurement is made of the electrostatic capacitance existing between two plates through which the material to be gauged is passed. Since the capacitance of a capacitor varies directly with the thickness and dielectric constant of the material between its plates, it is possible by this means to measure thickness of materials of a dielectric nature. When a sheet of dielectric material is passed through such a gauge, any variations in the thickness of the sheet material will cause variations in the capacitance of the capacitive cell or capacitor. This capacitance change in turn is recorded and by suitable calibrations, provides a means of monitoring the thickness of the sheet material being passed between the capacitor plates.

The particular apparatus for detecting and recording variations in the capacitor capacitance is not relevant to the present invention since various types of meters and recorders are known to the prior art.

In capacitance thickness gauges of the prior art, one major limitation to the accuracy of the gauge is its high sensitivity to variations in moisture content of the sheet material being passed therethrough or in the atmosphere itself. This is because water has a high dielectric coefficient compared to most other dielectric materials. Therefore, prior art capacitance gauges must, for the sake of accuracy, be used on sheet material of constant moisture content and in an atmosphere of constant humidity.

Another limitation of prior art capacitance gauges is that imposed by expansions and contractions due to temperature changes. Temperature changes, which are most likely to occur during continued usage, will of course result in variations of the capacitor gap unless compensating provision is made. This results in overall low accuracy.

Accordingly, it is one object of the present invention to provide a capacitance thickness gauge with provision to permit compensation for variations in the moisture content of the atmosphere or the material being measured.

Another object of the present invention is to provide a capacitance thickness gauge having a relatively constant capacitance between its capacitance plates regardless of surrounding temperature changes.

Other objects, advantages and features of the present invention will become apparent from the following description of one embodiment thereof, when taken in connection with the accompanying drawing.

SUMMARY OF THE INVENTION

Briefly, the present invention is practiced in one form by a capacitance thickness gauge comprising an air capacitor which senses changes in the thickness of a dielectric sheet material passing through the air gap of a primary capacitor cell. The capacitor cell has a grounded primary plate and a primary sensing plate which is insulated from the cell structure and charged relative thereto. A grounded secondary plate is movably disposed adjacent the charged primary sensing plate on the opposite side thereof from the primary capacitor cell air gap. Movements of the secondary plate cause variations in the charge of the charged primary sensing plate, in turn causing variations in the capacitance of the capacitor cell. Thus the variable capacitance of the cell permits calibration for varying moisture content in the sheet material and in the atmosphere. In addition, the primary capacitor cell is made of selected materials so that thermal expansion and contraction of the various parts have substantially no effect on the capacitance of the cell.

Figure 2:
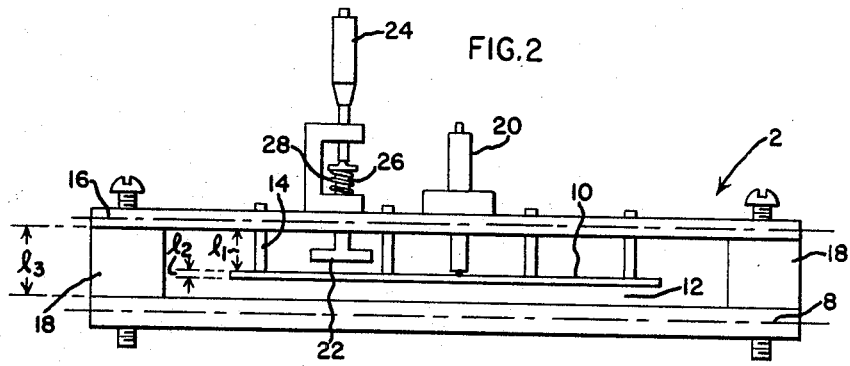
Figure 3:
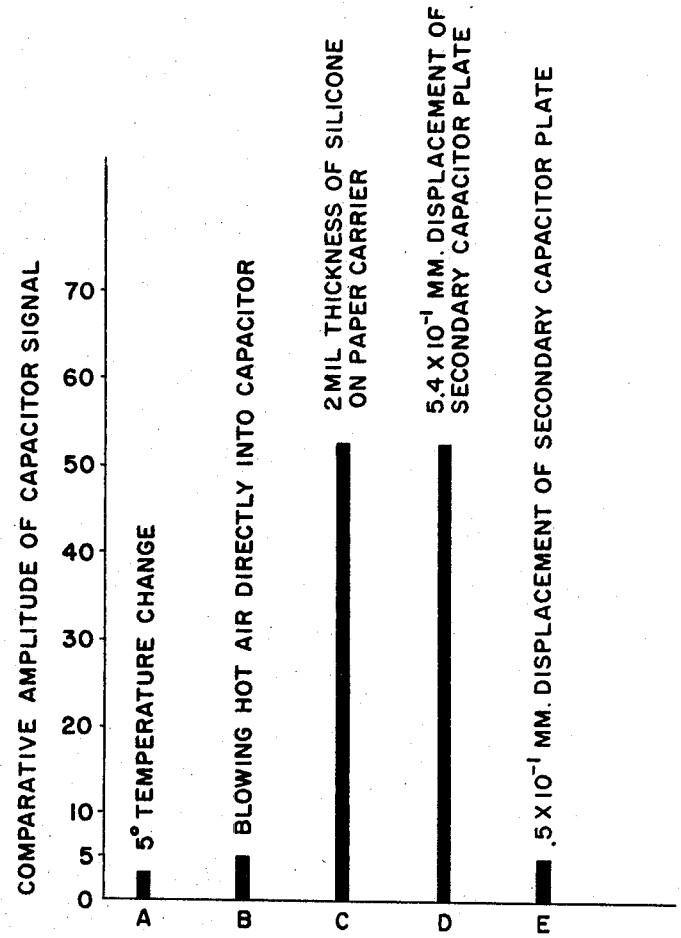

In the drawing:
FIG. 1 is a schematic diagram of the capacitive meter, detector, recorder and air capacitor cell according to the present invention.
FIG. 2 is a front elevation view of the capacitor cell according to the present invention.
FIG. 3 is a graph representing the sensitivity of the capacitor cell of the present invention to various stimuli.

DESCRIPTION

Referring now to FIGS. 1 and 2, showing schematically the environment and use of the present invention, a capacitance cell generally indicated at 2 is electrically connected to a capacitance meter 4 and a recording apparatus 6. Capacitor cell 2 includes a grounded primary plate 8 and a charged insulated sensor plate 10 disposed parallel to primary plate 8 and separated therefrom by an air gap 12. Charged sensing plate 10 is electrically connected to a source of electrical potential but is insulated by means of ceramic standoffs 14 from the grounded bottom plate 8 and its associated structure. Charged sensing plate 10 is also mounted relative to grounded plate 8 by means of the ceramic standoffs 14 which depend from mounting platform 16. Platform 16 is, in turn, spaced from grounded plate 8 by means of spacer members 18.

A web or sheet material 11 is disposed to move continuously from one to the other of rolls 13 through the air gap 12. This web or sheet 11 is the workpiece or object whose thickness is to be monitored by the capacitor cell 2.

Referring further to FIG. 2, a detector member 20 is mounted on platform 16 and is in electrical contact with sensor plate 10 and with capacitance meter 4.

A grounded secondary capacitor plate 22 depends from mounting platform 16. Secondary plate 22 is operatively connected to the stem or spindle of a micrometer 24, which is mounted to platform 16 and advances and retracts in a direction normal to the plane of capacitor plates 8, 10 and 22. Secondary capacitor plate 22 is movable but nonrotatable relative to platform 16. The spindle of micrometer 24 abuts spindle 26 of secondary capacitor plate 22. A compression spring 28 urges spindle 26 against the spindle of micrometer 24. Spindle 26 has an axially extending key (not shown) to prevent its rotation relative to micrometer 24 or platform 16.

Capacitor cell 2, and in particular the charged plate 10, ceramic standoffs 14, and spacer members 18, are structured so as to provide a constant capacitance of capacitor 2 despite thermal expansions and contractions of the cell. The following equations will show how this is accomplished:

let $C$ = capacitance of cell 2 (between plates 8 and 10)
$C'$ = capacitance after a temperature change
$A$ = area of plate 10
$l_1$ = height of standoff 14
$\alpha_1$ = coefficient of expansion of standoff 14
$l_2$ = height of plate 10
$\alpha_2$ = coefficient of expansion of plate 10
$l_3$ = height of spacer 18
$\alpha_3$ = coefficient of expansion of spacer 18
$\Delta t$ = temperature change
$X$ = air gap 12 of capacitor By well known formula, $$C = \frac{A}{4\pi X} = \frac{A}{4\pi(l_3 - l_2 - l_1)}$$

and $$C' = \frac{A(1 + 2\alpha_2 \Delta t)}{4\pi[l_3 + l_3\alpha_3\Delta t - l_2 - l_2\alpha_2\Delta t - l_1 - l_1\alpha_1\Delta t]}$$

By hypothesis $C = C'$ or $$\frac{A}{4\pi(l_3 - l_2 - l_1)} = \frac{A(1 + 2\alpha_2 \Delta t)}{4\pi[l_3 - l_2 - l_1 + \Delta t(l_3\alpha_3 - l_2\alpha_2 - l_1\alpha_1)]}$$

This equation reduces to $$2\alpha_2 = \frac{l_3\alpha_3 - l_2\alpha_2 - l_1\alpha_1}{l_3 - l_2 - l_1}$$

Due to considerations other than thermal coefficients of expansion (i.e., strength and insulation), spacer members 18 are of carbon steel, and standoff pieces 14 are of a ceramic material such as alumina. Thus, the values of $l_1$ and $\alpha_1$ and $l_3$ and $\alpha_3$ in the above equations are fixed by structural requirements. Using approximations for the value of $l_2$, the thickness of plate 10, an approximate value of $\alpha_2$ can be calculated. This value will then characterize the material to be used for plate 10. At this point then, having chosen the material for plate 10 and knowing its coefficient of expansion precisely, the value of $l_2$ can be calculated with precision to balance the equation above, to result in a thermally stable capacitor.

In the operation of the moisture compensating feature of the present invention, secondary capacitor plate 22 is moved slightly either toward or away from charged plate 10. This movement is measured by a micrometer handle and the range is suitably calibrated. Movement of the grounded plate 22, for example, away from charged plate 10 will result in a decrease of the charge on plate 10 with a corresponding decrease in the capacitance of the primary capacitor (plates 8 and 10). Conversely, a movement of grounded secondary plate 22 toward charged plate 10 increases the charge on plate 10 and therefore the capacitance of the primary capacitor. This calibrated adjustment of the capacitance of the primary capacitor cell 2 permits the primary capacitor to be standardized or adjusted for extraneous variables that would cause changes in the capacitance of a capacitor without this modification. Chief among these external variables is atmospheric humidity and moisture content in the sheet material to be measured, which appreciably changes the dielectric coefficient of the capacitor.

In FIG. 3, there is graphically shown the comparative responses of the air capacitance gauge of the present invention to the various indicated stimuli. The chart shows that temperature changes, either sudden or gradual, have a very slight effect on the capacitor as compared to the signal produced by even slight thicknesses of dielectric materials being passed therethrough, the intended purpose of the gauge. The chart also shows that the capacitor signal change is proportional to displacement of the secondary capacitor plate relative to the sensor plate 10. This chart illustrates the reason for the secondary capacitor, that being to balance even the slight inaccuracies represented by bars A and B. By adjustment of the secondary capacitor, these displacements may be balanced out of existence.

It will be appreciated that a capacitance thickness gauge has herein been described which overcomes certain limitations of the prior art. That is, the present invention provides a capacitance gauge relatively free from errors due to thermal expansions and contractions, and also free from instability resulting from atmospheric humidity.

What is claimed is:

1. A capacitor having first and second primary plates separated by an air gap, said capacitor being adapted for monitoring thickness of a dielectric film passing between said primary plates, and
    a secondary plate with means to maintain it at the same potential as said first primary plate and separated from said second primary plate by a second air gap, said first primary plate and said secondary plate being on opposite sides of said second primary plate, said secondary plate being relatively movable in a direction normal to the side of said second primary plate facing said secondary plate.

2. A capacitor according to claim 1 further including a spindle and the spindle of a micrometer in which said secondary plate is mounted on said spindle which is disposed perpendicular to the plane of said secondary plate, said spindle being urged into abutting relationship to said spindle of a micrometer and fixedly mounted relative to said capacitor.

3. A capacitor according to claim 1 in combination with a detector member, a capacitance meter and a recording means to detect, measure, and record the capacitance of said capacitor, said detector member being in electrical contact with said second primary plate and said capacitance meter.

4. A capacitor having first and second primary plates separated by an air gap X, said capacitor being adapted for monitoring thickness of a dielectric film passing between said primary plates, a mounting platform, standoff member, and spacer member,
    a secondary plate with means to maintain it at the same potential as said first primary plate and separated from said second primary plate by a second air gap, said first primary plate and said secondary plate being on opposite sides of said second primary plate, said secondary plate being relatively movable in a direction normal to the side of said second primary plate facing said secondary plate, said second primary plate having a thickness dimension $l_2$ and a coefficient of expansion $\alpha_2$, and depending from said mounting platform and insulated therefrom by said standoff member having a height dimension $l_1$ and a coefficient of expansion $\alpha_1$, said mounting platform spaced from said first primary plate by said spacer member having a height dimension $l_3$ and a coefficient of expansion $\alpha_3$, said dimensions and coefficients substantially satisfying the equation:

$$2\alpha_2 = \frac{(l_3\alpha_3 - l_2\alpha_2 - l_1\alpha_1)}{(l_3 - l_2 - l_1)}$$

References Cited

UNITED STATES PATENTS

| 1,878,109 | 9/1932 | Clark | 324—61 |
| 2,623,928 | 12/1952 | Bower | 324—61 |
| 2,806,204 | 9/1957 | Rothacker | 324—61 |
| 2,880,390 | 3/1959 | Calvert | 324—61 |
| 3,031,617 | 4/1962 | Paquette | 324—61 |

EDWARD E. KUBASIEWICZ, Primary Examiner

U.S. Cl. X.R.

317—246, 249